United States Patent
Schilling et al.

(10) Patent No.: US 7,056,053 B2
(45) Date of Patent: Jun. 6, 2006

(54) BOLTING ARRANGEMENT INCLUDING A TWO-PIECE WASHER FOR MINIMIZING BOLT BENDING

(75) Inventors: Jan Christopher Schilling, Middletown, OH (US); James Edward Gutknecht, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/305,862

(22) Filed: Nov. 27, 2002

(65) Prior Publication Data
US 2004/0101384 A1   May 27, 2004

(51) Int. Cl.
*F16L 23/00* (2006.01)
(52) U.S. Cl. .................. 403/337; 285/412; 411/537
(58) Field of Classification Search .......... 411/537, 411/538, 544, 10, 368; 285/368, 412; 403/335, 403/337
See application file for complete search history.

(56) References Cited

U.S. PATENT DOCUMENTS

| | | | | |
|---|---|---|---|---|
| 2,308,745 A | * | 1/1943 | English ................ | 285/94 |
| 3,171,518 A | * | 3/1965 | Bergmann ............. | 403/296 |
| 3,174,386 A | * | 3/1965 | Lewis ................... | 411/10 |
| 3,220,289 A | * | 11/1965 | Farekas ................ | 82/147 |
| 3,220,389 A | * | 11/1965 | Van Rinsum et al. .. | 123/268 |
| 3,749,362 A | * | 7/1973 | O'Connor et al. ..... | 254/29 A |
| 4,225,264 A | * | 9/1980 | Coone .................. | 403/337 |
| 4,620,264 A | * | 10/1986 | Ushifusa et al. ....... | 361/792 |
| 4,640,537 A | * | 2/1987 | Chaix et al. ........... | 285/368 |
| 4,781,006 A | | 11/1988 | Haynes ................. | 52/583 |
| 4,830,557 A | | 5/1989 | Harris et al. .......... | 411/113 |
| 5,037,258 A | * | 8/1991 | Heurteux .............. | 411/104 |
| 5,263,997 A | | 11/1993 | Parker et al. .......... | 415/214.1 |
| 5,451,116 A | | 9/1995 | Czachor et al. ....... | 403/338 |
| 5,802,129 A | | 9/1998 | Deaver et al. ......... | 376/287 |
| 6,131,962 A | | 10/2000 | Jensen et al. .......... | 285/337 |
| 6,176,663 B1 | * | 1/2001 | Nguyen et al. ........ | 411/368 |
| 6,250,041 B1 | | 6/2001 | Seccombe ............. | 52/712 |
| 6,364,564 B1 | | 4/2002 | Chaniot et al. ........ | 403/131 |
| 6,374,665 B1 | | 4/2002 | Somppi et al. ........ | 73/146 |

\* cited by examiner

*Primary Examiner*—Flemming Saether
(74) *Attorney, Agent, or Firm*—William Scott Andes; Alfred J. Mangels

(57) ABSTRACT

A two-piece washer to allow tilting movement of the washer elements. One annular washer element includes a convex annular surface that engages with a concave annular surface of a second annular washer element. When the convex and concave surfaces of the respective washer elements are placed in face-to-face engagement, the elements of the two-piece washer can pivot relative to each other. When utilized in a bolted connection, such two-piece washers can allow shifting of the bolted components relative to each other without imposing bending loads on the connecting bolt.

4 Claims, 3 Drawing Sheets

BOLTING ARRANGEMENT INCLUDING A TWO-PIECE WASHER FOR MINIMIZING BOLT BENDING

BACKGROUND OF THE INVENTION

The present invention relates to bolting arrangements wherein two flanges are bolted together. More particularly, the present invention relates to bolting arrangements in which bolt bending resulting from relative movement of the flanges is minimized.

Flanges are generally bolted together by inserting bolts through bolt holes provided in each of the flanges and that are aligned with each other. Such bolted flanges usually remain in their bolted condition, because a number of connecting bolts are generally provided to securely hold the bolted flanges together. However, the imposition of large radial, tangential, or axial loads on one or both components to which the respective flanges are secured can impose on the connecting bolts bending moments or tensile forces that can cause deformation or rupture of the bolts.

For example, unusual and sometimes large loads can be applied to bolted flanges in turbomachines, where pairs of flanged end casings are commonly bolted together. In aircraft gas turbine engines that have axial flow fans or axial flow compressors, rotor blade failures, which can be caused by foreign object damage to fan or compressor blades resulting from foreign objects that are drawn into the fan or compressor, can cause rotor unbalance conditions. Such rotor unbalance conditions can impose radial, circumferential, and possibly also axial loads that can shift the positions of the flanges radially relative to each other, circumferentially relative to each other, or axially relative to each other. In either event, unintended high shear, bending, or tensile loads, or a combination of such loads, can be applied to the flange connecting bolts, leading to bolt deformation, and possibly to bolt rupture and separation of the bolted casings from each other. Casing separation at the bolted flanges is an undesirable condition, and the present invention is directed to avoiding flange bolt failures by minimizing bending and axial stresses imposed on flange connecting bolts when the flanges are subjected to relative movement with respect to each other as a result of external loads applied to the components to which the flanges are connected.

BRIEF DESCRIPTION OF THE INVENTION

Briefly stated, in accordance with one aspect of the present invention, there is provided a bolting arrangement in which two-piece washers are provided to allow pivotal movement of the connecting bolts at a flanged connection. The washers include a first annular washer element having oppositely-facing major annular faces and having a first washer element central axis. One major annular face of the first washer element is defined by a convex surface. A second annular washer element having oppositely-facing major annular faces and having a second washer element central axis is also provided. One major annular face of the second washer element is defined by a concave surface. The convex surface and the concave surface are in surface-to-surface contact with each other and are movable relative to each other so that their respective axes can assume non-coaxial positions.

BRIEF DESCRIPTION OF THE DRAWINGS

The structure, operation, and advantages of the present invention will become further apparent upon consideration of the following description, taken in conjunction with the accompanying drawings in which.

DETAILED DESCRIPTION OF THE INVENTION

Figure 1:
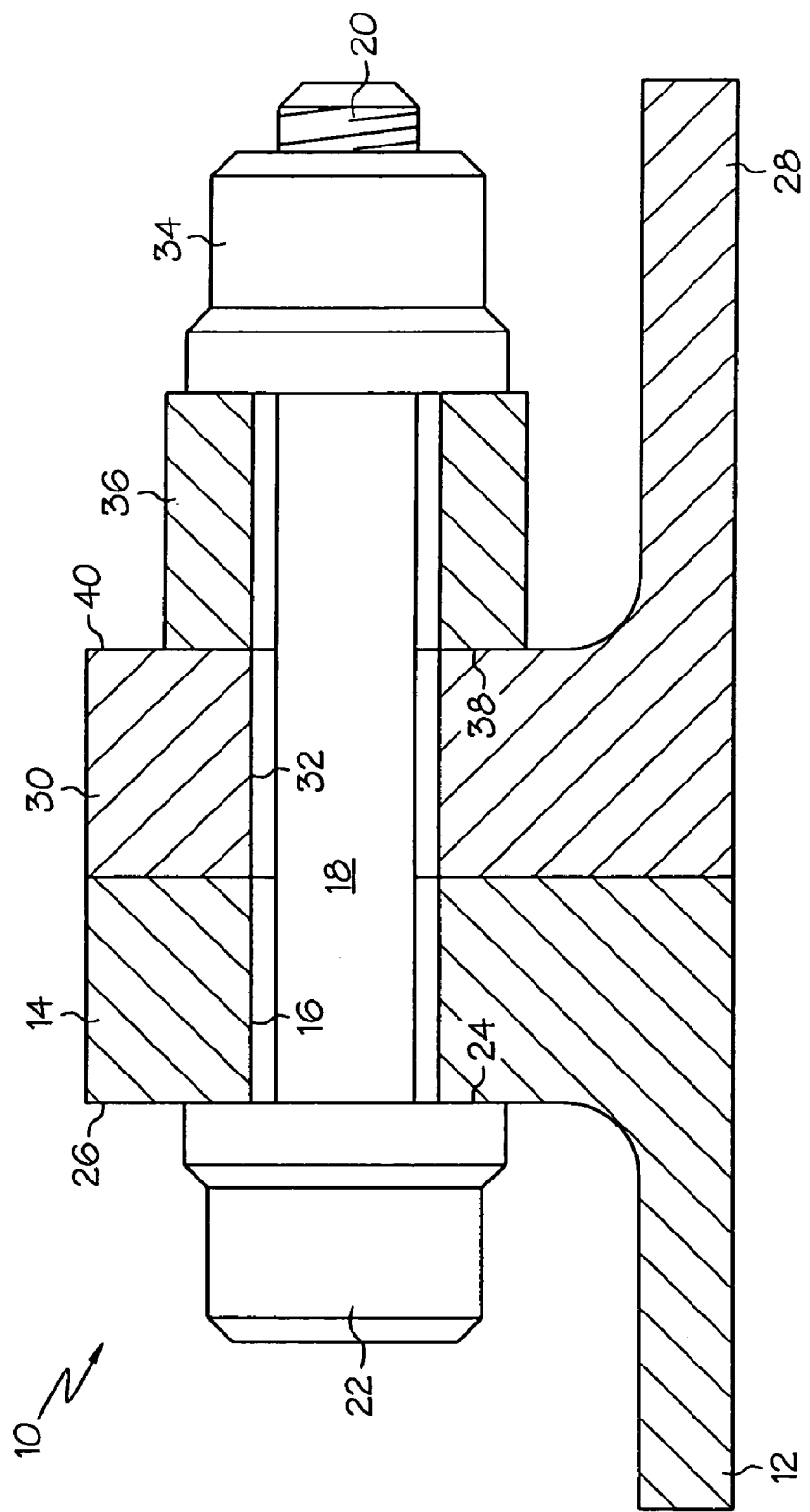
FIG. 1 is a fragmentary cross-sectional view through a conventional, known bolted flange connection.

Referring now to the drawings, and particularly to FIG. 1 thereof, there is shown a conventional bolted connection at a flange joint 10 at which two casing members are connected. A first annular casing has a casing wall 12 that terminates at an outwardly-extending radial flange 14. A plurality of throughbores 16 (only one of which is shown in FIG. 1) is provided in flange 14 for receiving the shank 18 of a connecting bolt 20, which includes a bolt head 22 having an annular bearing face 24 that is in tight contacting engagement with outer surface 26 of flange 14 when bolt 20 is tightened.

Similarly, a second annular casing has a casing wall 28 that terminates at an outwardly-extending radial flange 30 that includes a plurality of throughbores 32 (only one of which is shown in FIG. 1) for receiving shank 18 of bolt 20. The end of bolt 20 opposite from bolt head 22 receives a connecting nut 34 and an annular spacer 36 so that when bolt 20 and nut 34 are tightened, annular end surface 38 of spacer 36 is in contacting relationship with outer surface 40 of flange 30, so that flanges 14 and 30 are in tight, contacting engagement.

As shown in FIG. 1, the bolt hole defined by aligned throughbores 16, 32 has a diameter that is slightly larger than that of bolt shank 18. Consequently, a small amount of radial or circumferential misalignment between flanges 14 and 30 can take place without imposing a bending or shearing force on bolt 20. However, any misalignment greater than the gap between the bolt and the throughbores in their correctly aligned position as shown in FIG. 1 will impose bending or shear loads, or both, on the bolt. Such loading of the bolt, if sufficiently high, can result in bolt failure, which could allow separation of the casings at the flange joint.

Figure 2:
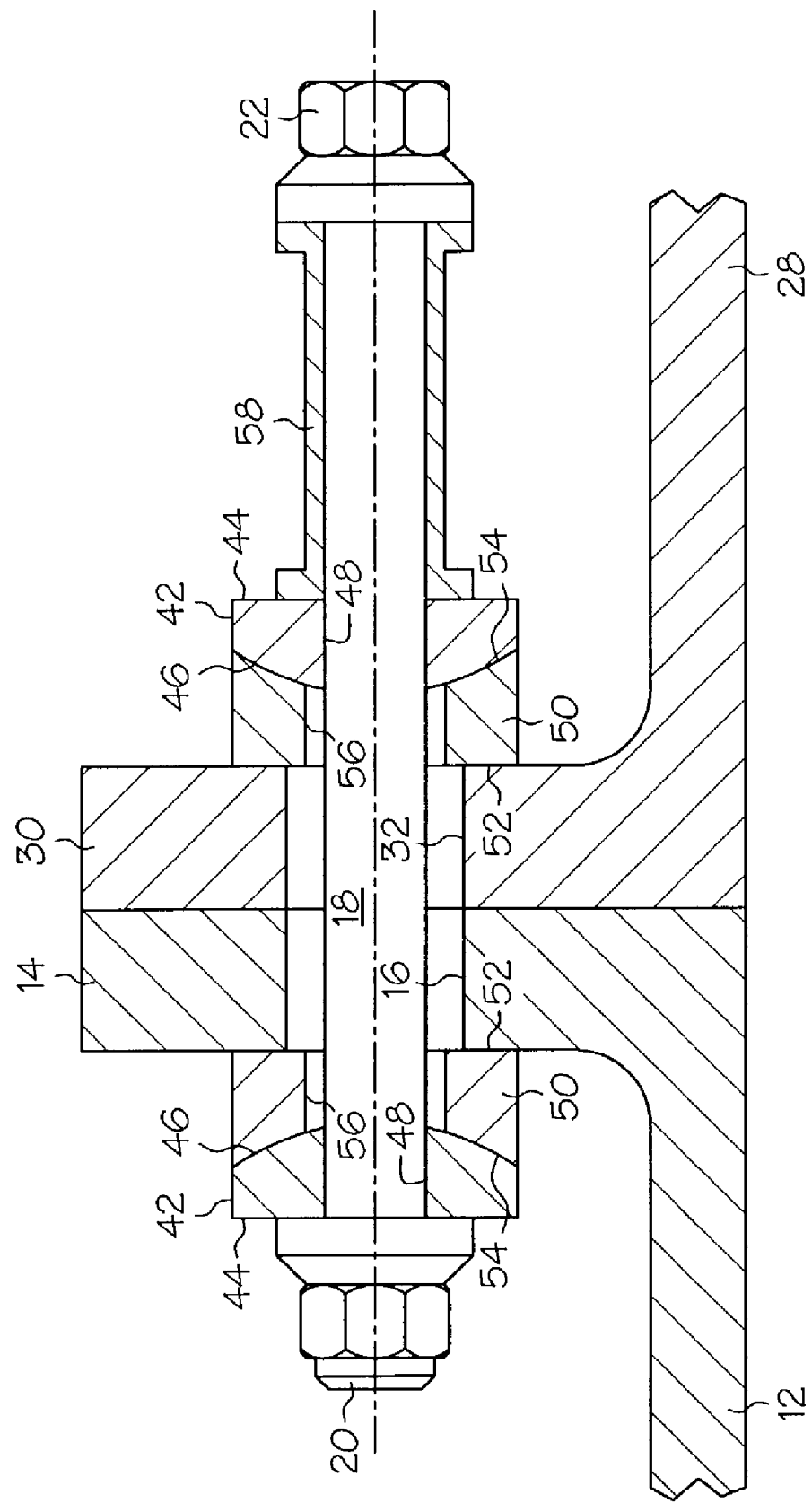
FIG. 2 is a fragmentary cross-sectional view through a bolted flange connection utilizing an embodiment of the invention.

Referring now to FIG. 2, wherein the same reference numerals identify parts having the same configuration as those shown in FIG. 1, there is shown an embodiment of the present invention. As shown, a bolt arrangement is provided that allows considerable radial or circumferential misalignment of flanges 14, 30, and without imposing high shear or bending loads on bolt 20. In the embodiment shown, flange throughbores 16, 32 have a larger diameter than the corresponding throughbores in the conventional flange connection shown in FIG. 1. In that regard, an annular gap between throughbores 16, 32 and bolt shank 18 can advantageously be provided, to allow bolt 20 to tilt relative to the axes of throughbores 16, 32. That gap can be of such a size as to permit the axis of bolt 20 to tilt relative to the axes of throughbores 16, 32 to an angle of up to about 15°, preferably between about 5° and about 15°. Depending upon the particular flange connection configuration and the position of the flange in the particular application in which the flanged connection is utilized, the maximum tilt angle could be made larger. The tilting of bolt 20 can be permitted without imposing a bending stress on the bolt by providing at each end of the bolted connection a two-piece washer that is in contact with a respective flange outer surface and that accommodates the tilt of the bolt relative to the axes of the throughbores.

The two-piece washer includes a first annular washer element 42 that has a flat annular face 44 at one annular end and a convex annular face 46 on the opposite annular end. Additionally, the diameter of inner opening 48 of first washer element 42 can be substantially equal to the diameter of bolt shank 18.

A second annular washer element 50 also has a flat annular face 52 at one annular end, and a concave annular face 54 on the opposite annular end. Additionally, the diameter of inner opening 56 of second washer element 50 can be substantially larger than the diameter of bolt shank 18, to accommodate bolt tilt under severe loading conditions and thereby avoid bolt contact with inner opening 56.

The curvature of convex annular face 46 of first washer element 42 can be substantially the same as the curvature of concave annular face 54 of second washer element 50. The curvatures are selected to allow relative sliding movement to occur between the curved faces of first and second washer elements 42, 50 when the curved faces are placed in contacting relationship, as shown in FIG. 2. The curvature of the curved faces of the first and second washer elements can each be spherical and of the same radius, with the centers of curvature of each of the curved faces lying on the respective washer element longitudinal axis. Alternatively, the curvatures of the curved faces can be different from each other, if it is desired to minimize the contact area between the curved surfaces when the curved surfaces of the washer elements are placed in contacting engagement.

Also shown in FIG. 2 is a tubular spacer 58 that can be placed between the washer adjacent to a flange surface and bolt head 22, although it could also be positioned adjacent the connecting nut, if desired. Tubular spacer 58 can be made from a metallic material and can be dimensioned to have a compressive strength that is lower than that of bolt 20. The spacer crush strength can advantageously be of the order of from about 60% to about 80% of the bolt tensile strength. Spacer 58 is adapted to crush when bolt 20 is placed under an excessive axial tensile load, to thereby avoid excessive axial stresses on the bolt shank and to prevent tensile failure of the bolt. Accordingly, the disclosed arrangement maintains an interconnection between the adjacent casings when the flange joint is subjected to large axial separation forces, to avoid complete separation of the casings from each other. Tubular spacer 58 can have a length to diameter ratio, which is the ratio of the length of the spacer to the outer diameter in the portion between the spacer ends, and a wall thickness sufficient to allow a predetermined amount of axial deformation. Typical length to diameter ratios can range from about 1.5 to about 3.0.

Figure 3:
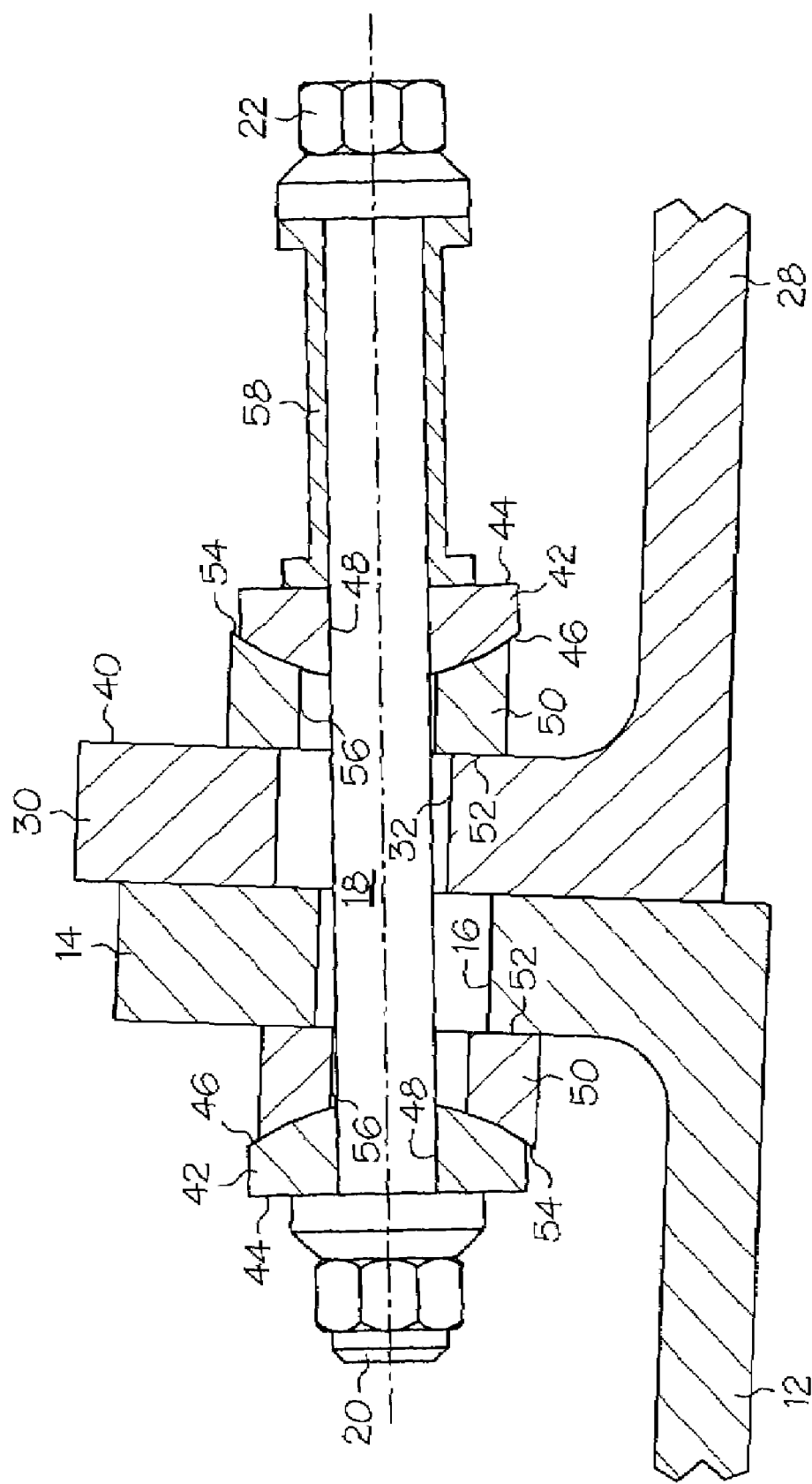
FIG. 3 is a fragmentary cross-sectional view through the bolted flange connection of FIG. 2 showing the operation of an embodiment of the present invention to minimize bending of the connecting bolts as a result of radial shifting of the flanges relative to each other.

FIG. 3 shows the bolted connection of FIG. 2 after flanges 14 and 30 have shifted radially relative to each other, which can result from a particular loading condition to which the casings are subjected. As shown, the longitudinal axis of bolt shank 18 is inclined relative to the axes of throughbores 16 and 32. However, because the two-piece washers at each end of the bolted connection allow pivotal movement of the washer elements relative to each other, so that their respective axes are inclined relative to each other, bolt 20 is substantially free of the bending stresses that would otherwise exist if conventional flat washers were utilized in the bolted connection. As is also apparent from FIG. 3, each of first washer elements 42 has tilted along with bolt shank 18, whereas each of second washer elements 50 has remained stationary relative to flange outer surfaces 26 and 40 with which it is in contact. And should the axial forces tending to axially separate the flanges become sufficiently large, deformable spacer 58 will absorb the axial force, to lower the tensile stress to which bolt 20 is subjected.

The foregoing description of the invention is presented in the context of bolting together two flanges. However, the disclosed bolting technique and the disclosed two-piece washers can also be utilized in the bolting together of components other than flanges. Moreover, the flanges need not be annular flanges—they can alternatively be linear flanges. And the movement of the respective parts relative to each other as shown in FIG. 3 and the effects of the disclosed two-piece washers will also apply where the flanges shift circumferentially relative to each other.

Although particular embodiments of the present invention have been illustrated and described, it would be apparent to those skilled in the art that various changes and modifications can be made without departing from the spirit of the present invention. It is therefore intended to encompass within the appended claims all such changes and modifications that fall within the scope of the invention.

The invention claimed is:

1. A bolted connection for bolting together a pair of annular casings, said bolted connection comprising:
   a. a pair of annular casings each having at an end an annular flange including a radially-extending planar surface adapted for surface-to-surface contact with the other radially-extending flange planar surface, wherein the radially-extending flange surfaces when in contact with each other and in an unbolted condition are slidable relative to each other both radially and circumferentially relative to a casing longitudinal axis, each flange including a plurality of circumferentially spaced throughbores for receiving respective connecting bolts;
   b. at least one connecting bolt having a longitudinal axis and including a bolt head, a bolt shank extending through one of said pair of flange throughbores, and a threaded end for receiving a connecting nut for connecting together the planar, radially-extending casing flanges, the at least one connecting bolt having a bolt shank outer diameter that is smaller than diameters of the flange throughbores to define a first gap between the bolt shank and the flange throughbores;
   c. a first two-piece annular washer between the bolt head and a flange surface of one of the flanges, and a second two-piece annular washer between the connecting nut and a flange surface of the other flange, each two-piece annular washer including a first annular washer element having a planar annular face and an oppositely-facing convex annular surface, and a second annular washer element having a planar annular face and an oppositely-facing concave annular surface, wherein the respective convex and concave annular surfaces of the first and second washer elements are in contacting relationship and are slidable relative to each other, and wherein the first and second washer elements have their respective planar annular faces facing in opposite, outwardly-facing directions with the planar faces of the first two-piece annular washer facing the bolt head and in contact with the flange surface of one of the flanges and the planar faces of the second two-piece annular washer facing the connecting nut and in contact with the flange surface of the other flange;

c. wherein the first washer elements that abut one of a bolt head and a connecting nut each have an inner diameter that corresponds in size with the bolt shank outer diameter, and the second washer elements that abut the flange surfaces have an inner diameter that is greater than the bolt shank outer diameter to define a second gap between the bolt shank and the second washer elements, so that upon relative radial and circumferential displacements of the contacting, radially-extending flange surfaces the first gap and the second gap allow angular movements of the connecting bolt longitudinal axis within the throughbores and relative to the flange planar surfaces, to minimize connecting bolt bending stresses upon relative radial or circumferential displacements of the radially-extending flange surfaces.

2. A bolted connection in accordance with claim 1, including a deformable spacer positioned between a two-piece washer and one of the bolt head and the connecting nut, to absorb axial tensile forces applied to the connecting bolt.

3. A bolted connection in accordance with claim 1, wherein each of the convex and concave surfaces is defined by a spherical curvature.

4. A bolted connection in accordance with claim 3, wherein each of the convex and concave surfaces has substantially the same radius of curvature.

* * * * *